United States Patent [19]
Smith

[11] Patent Number: 5,397,135
[45] Date of Patent: Mar. 14, 1995

[54] EXPANDING COLLET ASSEMBLY

[75] Inventor: Roger R. Smith, Erin, N.Y.

[73] Assignee: Hardinge Brothers Inc., Elmira, N.Y.

[21] Appl. No.: 84,151

[22] Filed: Jul. 1, 1993

[51] Int. Cl.$^6$ ............................................. B23B 31/40
[52] U.S. Cl. .................................. 279/2.04; 279/156; 279/157
[58] Field of Search ............................... 279/2.01–2.04, 279/51, 58, 2.09, 156, 157; 269/48.1; 82/169; 242/68.2, 72 R; 409/233

[56] References Cited

U.S. PATENT DOCUMENTS

| | | |
|---|---|---|
| 2,228,685 | 1/1941 | Benjamin . |
| 2,360,968 | 10/1944 | Mundy ............................. 82/169 |
| 2,383,036 | 8/1945 | Benjamin et al. . |
| 2,436,848 | 3/1948 | Benjamin et al. . |
| 2,462,155 | 2/1949 | Benjamin et al. . |
| 2,465,836 | 3/1949 | Benjamin . |
| 2,515,183 | 7/1950 | Benjamin et al. . |
| 2,672,789 | 3/1954 | Cross et al. . |
| 2,890,055 | 6/1959 | Garrison ....................... 279/156 X |
| 3,156,478 | 11/1964 | Lamusga . |
| 3,819,195 | 6/1974 | Lehde, Jr. et al. ................ 279/46.4 |
| 4,602,798 | 7/1986 | Wettstein . |
| 5,096,213 | 3/1992 | Terwilliger et al. . |

FOREIGN PATENT DOCUMENTS 1407696  7/1988  U.S.S.R. ............................ 279/2.04

OTHER PUBLICATIONS

Paul Forkardt, Forkardt Chucking Technique International Expanding Manderels and Collet Chucks, Nov. 1988.

Primary Examiner—Steven C. Bishop
Attorney, Agent, or Firm—Cushman, Darby & Cushman

[57] ABSTRACT

An expanding collet assembly comprises an arbor having a flange portion for securing to a machine tool spindle and a shaft portion extending from the flange portion. The shaft portion includes a first conical surface disposed at its free end and a second conical surface disposed adjacent the flange portion. Conical surfaces are parallel to each other and disposed radially inwardly in the direction away from the flange portion. An expanding collet having alternately disposed slots to form a plurality of fingers extend inwardly from opposite collet ends and have inner conical surfaces at the collet ends that cooperate with the first and second conical surfaces. The expanding collet is axially slidably disposed around the shaft portion between a relaxed position when the collet is disposed away from the flange portion and an expanded position when disposed toward the flange portion. A draw plug with a flanged head in engagement with one end of the collet is disposed axially through the arbor in an opening in the shaft portion. A draw bar adapter is disposed within a recess in the arbor and secures one end of the draw plug, the adapter being secured to a draw bar for axially actuating the draw plug, thereby actuating the collet. An annular work locating stop is secured to the flange portion and overlies at least a portion of the collet, the stop having an annular free edge for abutting against a workpiece. Another embodiment of the expanding collet assembly for smaller workpieces is also disclosed.

26 Claims, 6 Drawing Sheets

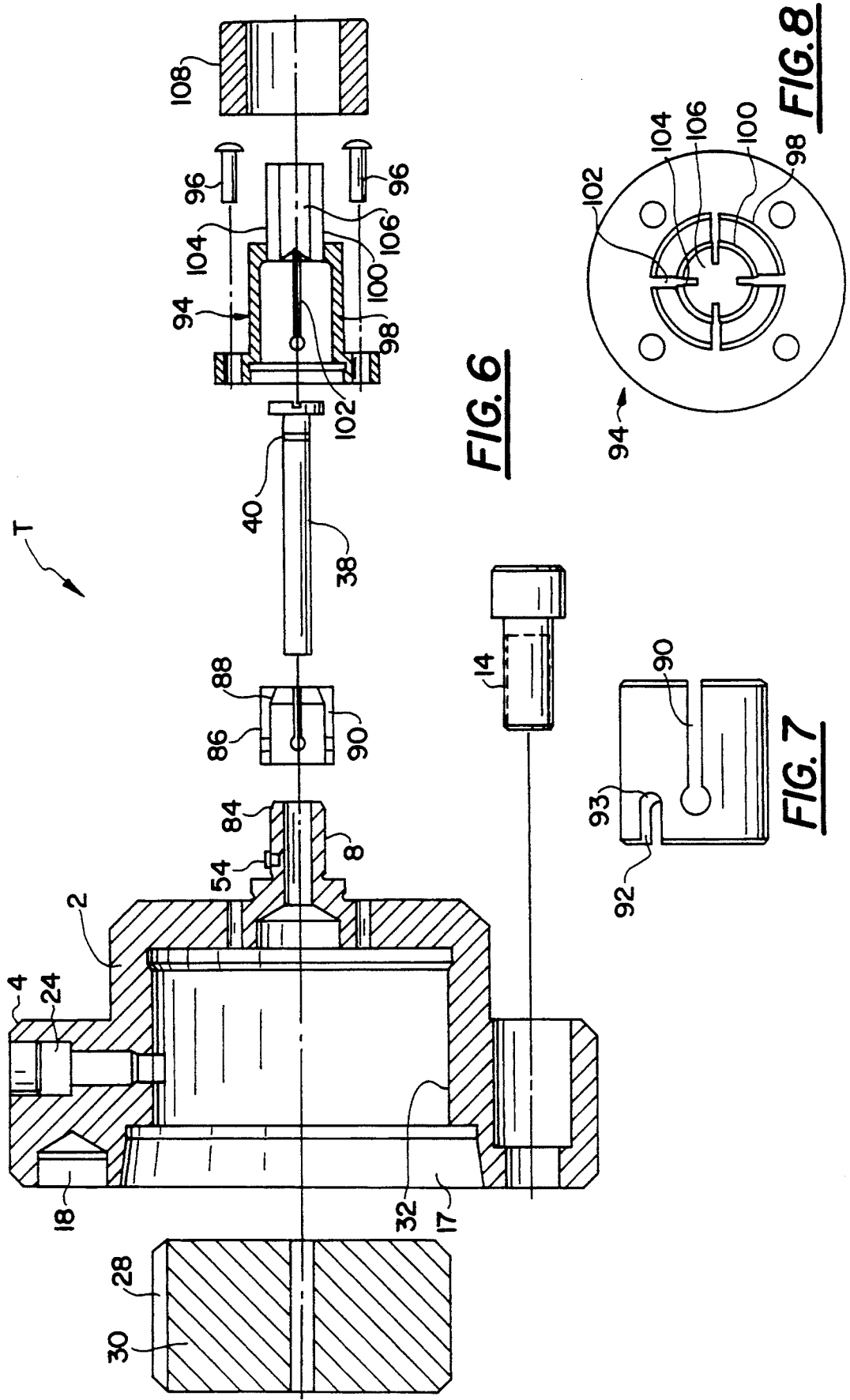

5,397,135

EXPANDING COLLET ASSEMBLY

FIELD OF THE INVENTION

The present invention relates generally to a machine tool work holder and particularly to an expanding collet assembly for use in a turning machine.

BACKGROUND OF THE INVENTION

Collets are normally used in automated tool machines for holding work stocks, usually bar or rod stocks, for machining. Expanding collets are used for internal chucking of a workpiece. However, when a collet is installed, it typically has to be adjusted for concentricity, requiring additional setup time.

There is therefore a need for an expanding collet assembly that would overcome this prior art shortcoming.

OBJECTS AND SUMMARY OF THE INVENTION

It is an object of the present invention to provide an expanding collet assembly that provides uniform parallel gripping through its grip range.

It is another object of the present invention to provide an expanding collet assembly that has limited stroke to prevent over expansion, thereby minimizing damage to the collet and the workpiece.

It is yet another object of the present invention to provide an expanding collet assembly that has a work locating stop that can be machined to suit the workpiece being worked on.

It is an object of the present invention to provide an expanding collet assembly that has a removably secured work locating stop so that different work stops may easily be installed to suit the several workpieces being worked on.

It is yet another object of the present invention to provide an expanding collet assembly that can grip a workpiece with a small internal dimension.

These and other objects of the present invention will become apparent from the following detailed description.

BRIEF DESCRIPTIONS OF THE DRAWINGS

FIG. 6 is an exploded view of FIG. 5.

FIG. 7 is an enlarged side elevational view of an expanding sleeve used in the embodiment of FIG. 5.

FIG. 8 is an enlarged end elevational view of an expanding collet used in the embodiment of FIG. 5.

DETAILED DESCRIPTION OF THE INVENTION

Figure 1:
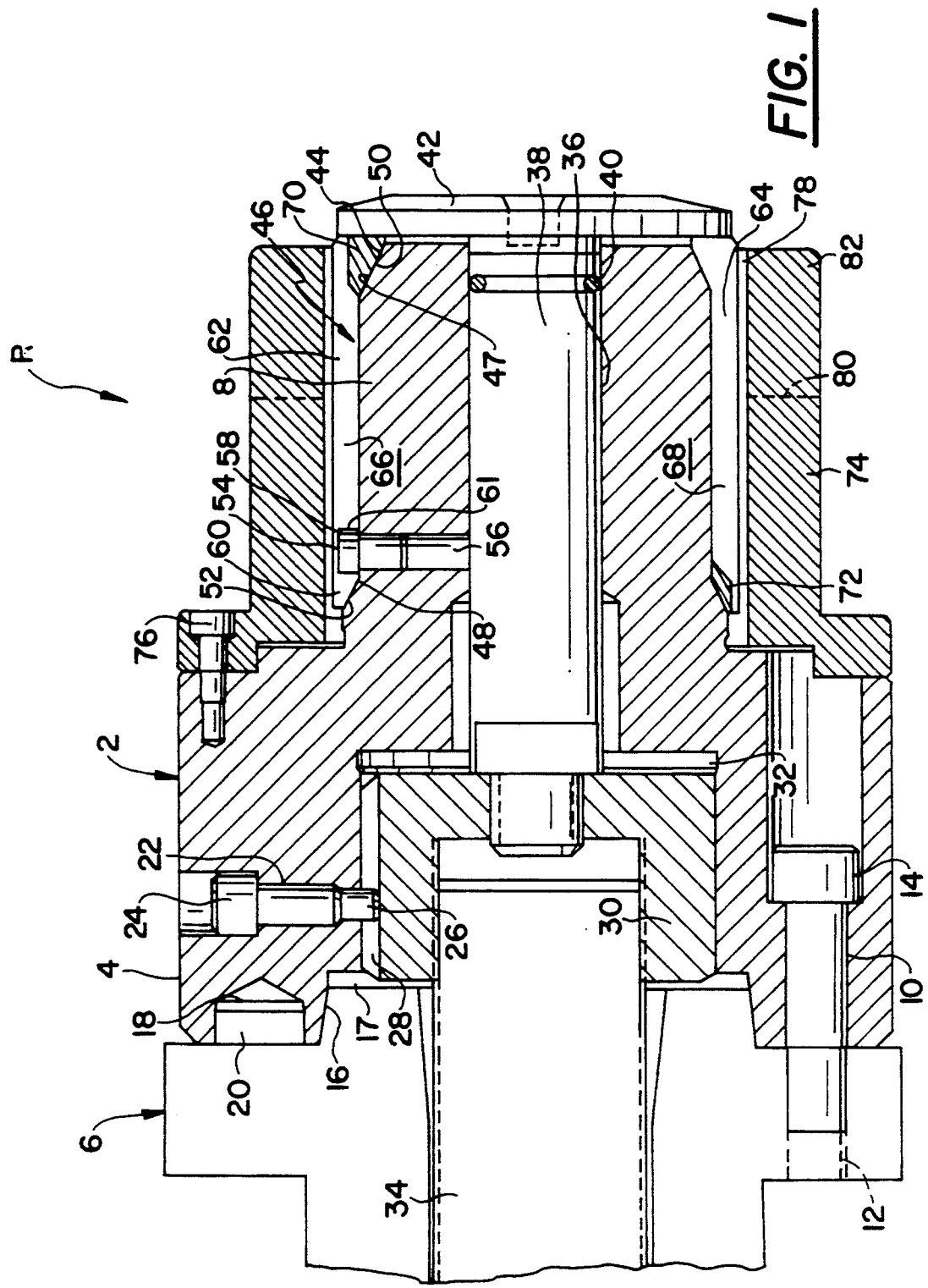
FIG. 1 is a cross-sectional view of an expanding collet assembly in accordance with the present invention, shown secured to a machine tool spindle.
Figure 2:
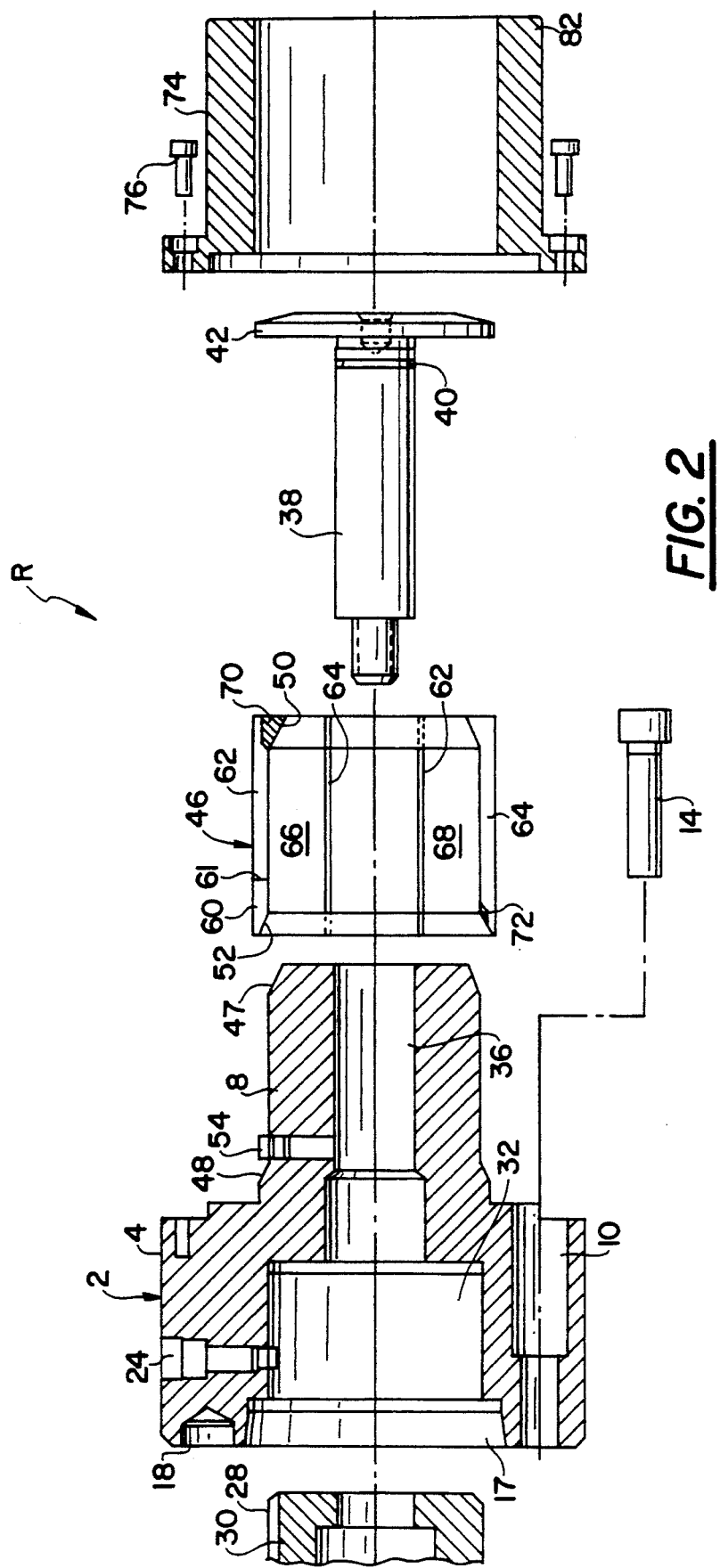
FIG. 2 is an exploded view of FIG. 1, with the machine tool spindle omitted.

A first embodiment in accordance with the present invention is the expanding collet assembly R as disclosed in FIGS. 1 and 2. The collet assembly R comprises an arbor or housing 2 having a flange portion 4 for securing to a machine tool spindle 6 and a shaft portion 8. The shaft portion 8 is concentric with the axis of rotation of the spindle 6. A plurality of holes 10 disposed in the flange portion 4 are aligned with a plurality of threaded holes 12 in the spindle 6 that cooperate with a plurality of bolts 14 for securing the arbor 2 to the spindle 6, as best shown in FIG. 1. A central tapered projection 16 on the spindle 6 cooperates with a complementary tapered recess 17 in the arbor 2 to provide a centering means when the arbor 2 is secured to the spindle 6. At least one bore 18 disposed at the rear face of the arbor 2 cooperates with a dowel 20 disposed on the face of the spindle 6 to provide a driving means when the arbor 2 is secured to the spindle 6.

The flange portion 4 has a radially disposed threaded hole 22 that receives a socket head key screw 24. An opposite end 26 of the screw 24 is received in a keyway slot 28 in a draw bar adapter 30 disposed in a central bore 32 in the flange portion 4. A draw bar 34 is secured to the adaptor 30 by conventional means, such as cooperating threads. The bore 32 is sized to permit the adapter 30 axially sliding movement therein when the draw bar 34 is actuated. The draw bar adapter 30 may be modified, such as by machining, to make it compatible with the draw tube used in the machine tool. Another adaptor (not shown) may still be connected to the adapter 30, if necessary, to further modify the adapter to the draw tube.

The shaft portion 8 has a central bore 36 that slidably receives a draw plug 38 that is threadedly secured at one end to the adapter 30, which is threadedly connected, as shown in FIG. 1, to the threaded end of draw bar 34. A seal 40 prevents any debris, such as chips, coolant fluid, etc., from entering the bore 36. The seal 40 is advantageously disposed in the draw plug 38 in an annular recess for ease in manufacture. The draw plug 38 has a flanged head 42 that engages the outer end 44 of an expanding collet 46 that is slidably supported around the shaft portion 8.

A person of ordinary skill in the art will understand that the collet 46 is automatically concentric with the spindle axis when it is installed on the shaft portion 8, since the shaft portion 8 is concentric with the spindle axis. Adjustments for concentricity is advantageously avoided during installation. Although the exterior shape of the collet 46 is disclosed as cylindrical, the collet 46 may be made in a variety of shapes, such as square, hexagonal, special shapes, etc. to suit the workpiece being gripped.

The shaft portion 8 has a pair of annular and parallel frusto-conical surfaces 47 and 48 that cooperate with corresponding frusto-conical surfaces 50 and 52 on the expanding collet 46.

A locating pin 54 disposed radially adjacent the frusto-conical surface 48 in the shaft portion 8 provides a stop for the expanding collet 46 to advantageously provide a limit to rotational movement of the expanding collet 46 as it is actuated axially by the draw plug 38 on the shaft portion 8. The pin 54 is advantageously sealed in its opening 56 to prevent debris from entering the inside of the arbor 2. A head 58 of the pin 54 projects above the surface of the shaft portion 8 and is received within a slot 60 disposed in the expanding collet 46. The slot 60 has a base 61 that engages the head 58.

The expanding collet 46 has a plurality of alternating longitudinal slots 62 and 64 that form adjacent longitudinal fingers 66 and 68 that are alternately interconnected at edge portions or bases 70 and 72, as best shown in FIG. 1. The expanding sleeve 46 expands when it rides upon the frusto-conical surfaces 47 and 48 as it is actuated by the draw plug 38. While the expanding sleeve is shown with six fingers for sake of clarity, it should be understood that more fingers are actually needed, for example 16, for relative ease of operation and relatively greater gripping range. Furthermore, the expanding collet is constructed out of a material that provides a limited degree of resilience, thereby allowing the collet to return to an original shape when shifted from an expanded position to a relaxed position.

A work locating stop 74 is a sleeve member secured to the flange portion 4 of the arbor 2 by means of a plurality of bolts 76. The stop 74 is advantageously removably secured to the arbor 2 such that different stops may be used depending on the needs of different workpieces. Thus, to machine a different workpiece, the entire collet assembly R need not be removed from the spindle 6; only the stop 74 need be replaced. Further, replacement of the stop 74 due to wear and tear is readily accomplished.

The work locating stop 74 is disposed around the expanding collet 46, with space 78 therebetween to provide the expanding collet 46 room to expand when actuated to grab a workpiece. The work locating stop 74 may be machined to any dimension and shape to suit the workpiece, as for example shown by the dashed lines 80, to advantageously provide a repeatable and accurate reference surface against which the workpiece is abutted. The stop 74 is advantageously made of relatively softer metal for ease in machining it.

Since the expanding collet 46 typically has a tendency to move the workpiece axially towards the spindle 6 during clamping, the work locating stop 74 advantageously prevents this tendency. It will be understood that an end portion 82 of the work locating stop 74 can be machined away, thereby exposing the underlying portion of the expanding collet 46 which will then be available for gripping the workpiece.

Figure 3:
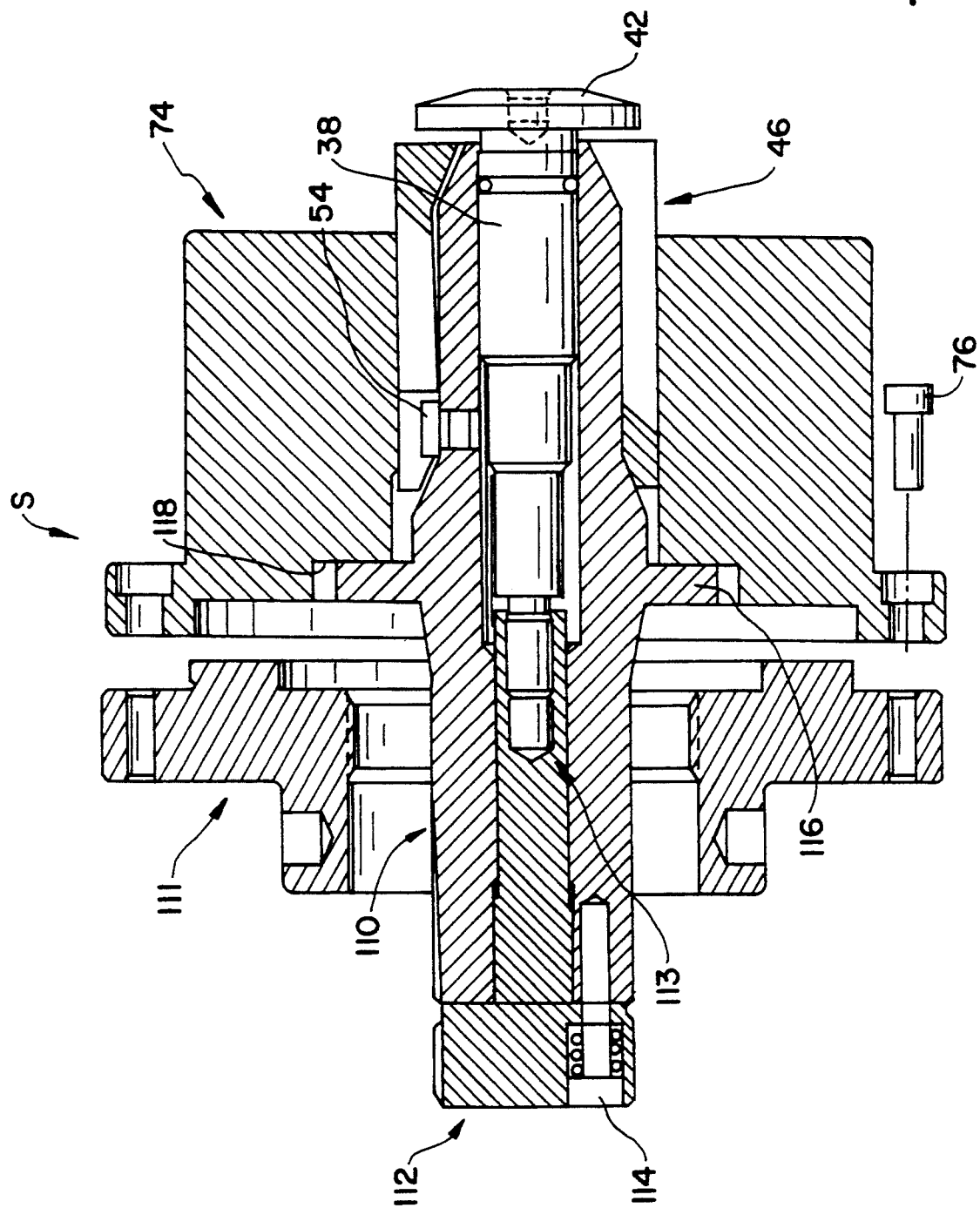
FIG. 3 is a cross-sectional view of a second embodiment of an expanding collet assembly.
Figure 4:
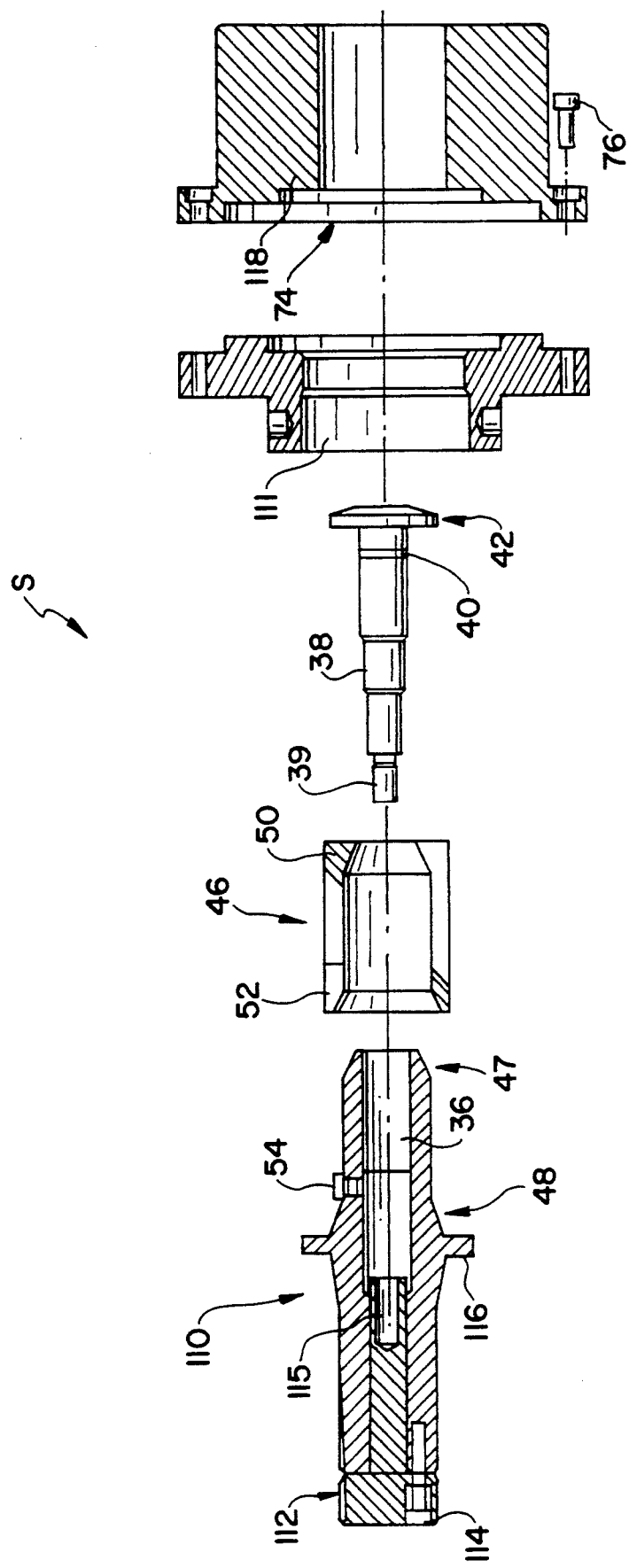
FIG. 4 is an exploded view of a second embodiment of an expanding collet assembly.

A second embodiment which introduces some minor variations to the above-disclosed structure is the expanding collet S disclosed in FIGS. 3 and 4. Note that all similar parts retain the same identification. Unlike the previous embodiment, which includes a one-piece housing 2 that consists of a flange portion 4 and shaft portion 8, the expanding collet system S includes a two-piece structure consisting of a reduced diameter arbor 110 and an adaptor 111. Individually, these two pieces are simpler to manufacture than the one-piece housing with its varying dimensions. As such, this two-piece approach simplifies production and facilitates manufacturing accuracy.

Similar to the first embodiment, the arbor 110 possesses a shaft portion that contains a pair of frusto-conical surfaces 47 and 48 each of which cooperates with the corresponding conical surface 50, 52 of the expanding collet 46. As before, a locating pin 54 is disposed in the shaft portion to prevent rotational movement of the expanding collet 46. A flange 116 also extends from the periphery of the of the collet 110. When assembled, the flange 116 contacts surface 118 of the locating stop 74 which assures that the work locating stop 74 and adaptor 111 will not come off the arbor 110 accidently due to improper assembly.

Unlike the first embodiment, where a uniform diameter is maintained between the ends of the draw plug, the second embodiment contains a draw plug 38 which is sectionally stepped with decreasing diameter portions so as to reduce its size and allow for a smaller central bore 36 that slidably receives the draw plug 38. Additionally, instead of passing the draw plug 38 through a housing 2 and securing it to an adaptor 30, the threaded end 39 of the draw plug 38 is secured directly in the arbor 110 by means of a threaded engagement in the bore 115 in the stem of bushing 112.

The threaded bushing 112 is secured to an end of the arbor 110 by a head cap screw 114. The bushing 112 allows the collet assembly to be directly screwed into a driving spindle and draw bar, providing for a quicker and simpler method of securing the assembly.

Figure 5:
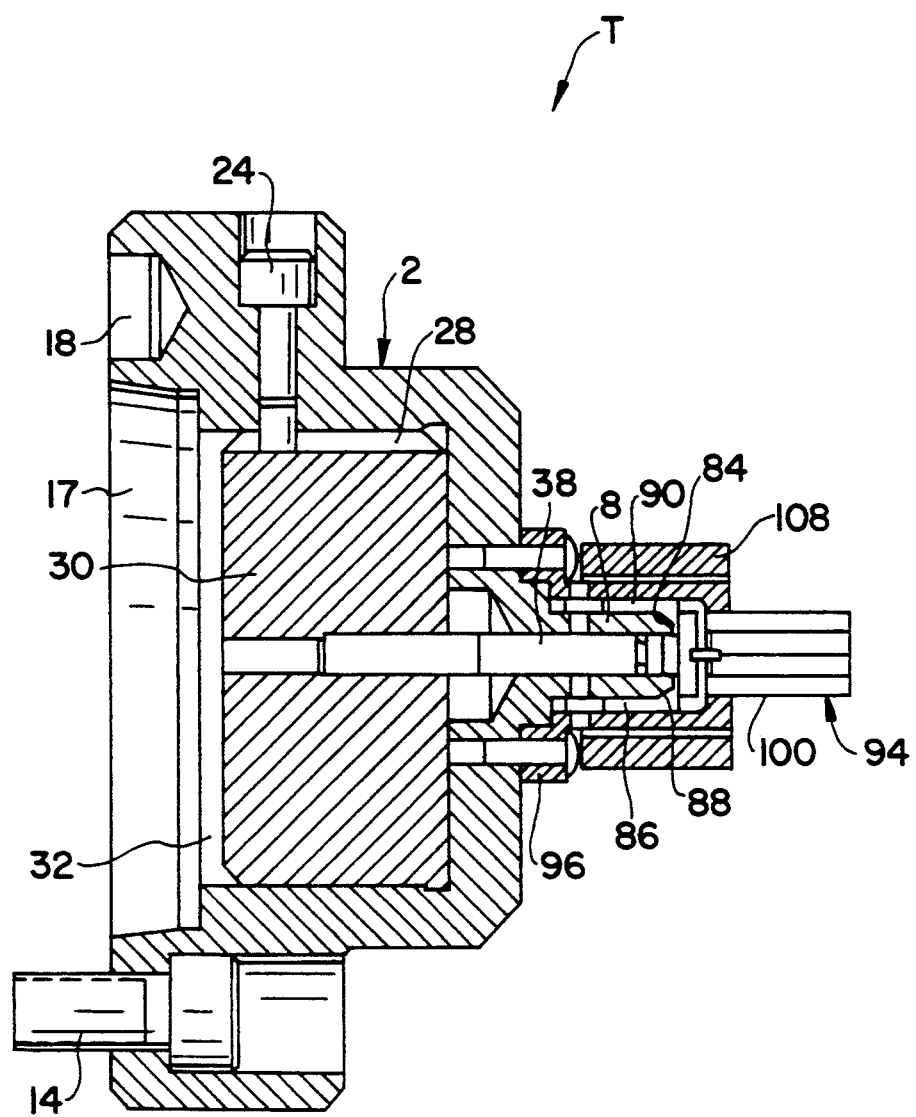
FIG. 5 is a cross-sectional view of a third embodiment of an expanding collet assembly.

A third embodiment in accordance with the present invention is the expanding collet T as disclosed in FIG. 5 and 6. Similar parts are similarly identified. The assembly T has an arbor or housing 2 for securing to a spindle by means of bolts such as at 14. The recess 17 mates with the projection 16 on the spindle 6 and the bore 18 with a dowel. The socket head key screw 24 engages the keyway 28 of the draw bar adapter 30 to keep the adapter from rotating within the bore 32. The shaft portion 8 of the arbor 2 has a conical surface 84 disposed at its front end. An expanding sleeve 86 is slidably secured to the shaft portion 8 and has inner conical surfaces 88 that cooperate with the conical surface 84 of the shaft portion 8, as best shown in FIGS. 5 and 6. The draw plug 38 is secured to the adapter 30, which in turn is secured to a draw bar to thereby actuate the draw plug and cause the expanding sleeve 86 to ride upon the conical surface 84, thereby expanding its front portion.

The expanding sleeve 86 has a plurality of slots 90 to allow its front end to expand as the conical surfaces 88 ride upon the conical surface 84. The seal 40 advantageously prevents contamination from getting into the interior of the arbor 2. A slot 92 cooperates with the locating pin 54 to advantageously prevent rotational movement of the expanding sleeve 86 and prevent relative motion with the shaft portion 8, as best shown in FIG. 7. The slot 92 has a base 93 that engages the protruding portion of the locating pin 54.

An expanding collet 94 is secured to the arbor 2 by a plurality of bolts 96 and fully encloses the expanding sleeve 86.

The expanding collet 94 has a nose portion 100 of smaller diameter than the sleeve portion 98, as best shown in FIGS. 6 and 8. Although the portion 100 is disclosed as being cylindrical, a person of ordinary skill in the art will understand that it can be of any exterior shape, such as hexagonal, square, etc., to suit the internal dimension of the workpiece being gripped.

The sleeve portion 98 has a plurality of slots 102. The nose portion 100 has a plurality of slots 104 and 106 that are aligned with the slots 102. The width of each of the slots 104 is substantially twice the width of each of the slots 106, as best shown in FIG. 8. The slots 102 each has a width substantially twice the width of each of the slots 104. The slots 106 are disposed in the central section of the nose portion while the slots 104 are disposed in the peripheral section, as best shown in FIG. 8.

An annular limit collar 108 is disposed around the sleeve portion 98 of the expanding collet 94. The limit collar 108 advantageously prevents over-expansion of the expanding collet 94 and provides a limit ring to stop the collet while it is being machined to size only. The expanding collet 94 secures the limit collar 108 when the collet 94 is expanded by the underlying expanding sleeve 86 when machining the collet 94 in the area of 100 to size.

The expanding collet 94 is advantageously removably secured to the arbor 2 so that a different expanding collet may be used for a different workpiece, without removing the entire collet assembly T from the machine tool spindle 6. For example, an expanding collet with a longer nose portion may be used if required by the configuration of the workpiece.

OPERATION

Similar in operation, the expanding collet assemblies R or S are secured to the spindle 6 and to the draw bar 34. The work locating stop 74 is machined to the desired dimension to suit the workpiece. The workpiece is mounted on the exposed portion of the expanding collet 46 against the work locating stop 74. When the draw bar is actuated to the left, the draw plug 38 with its flange head 42 pushes the expanding collet 46 to the left, causing the expanding collet 46 to expand when it rides upon the conical surfaces 47 and 48. The expanding collet fingers 66 and 68 then grab the workpiece. Because the workpiece would have been abutted against the work stop 74, the workpiece would remain in the same place during the clamping operation, ensuring that each workpiece is located accurately every time. The parallel conical surfaces 47 and 48 cooperating with the collet conical surfaces 50 and 52 advantageously provide parallel gripping of the workpiece in the grip range, ensuring accurate gripping with uniform pressures.

To release the workpiece, the draw bar 34 is actuated to the right, moving the draw plug flange head 42 away from the end 44 of the expanding collet 46, thereby allowing the expanding collet 46 to ride down the conical surfaces 47 and 48 and return to its normal, unexpanded shape. The locating pin 54 advantageously prevents relative rotation between the expanding collet 46 and the shaft portion 8 during the machining operation.

The expanding collet assembly T is also operated similarly. The workpiece is disposed around the nose portion 100, which is expanded by the expanding sleeve 86 when the draw plug 40 is actuated to the left. The expansion of the expanding sleeve 86 is accomplished by the cooperation between the conical surfaces 84 and 88 as the expanding sleeve 86 is pushed to the left by the draw plug 40. The limit collar 108 allows the nose portion 100 to be machined to a specific size to suit the workpiece. The expanding collet assembly T is advantageously used for small parts.

While this invention has been described as having preferred design, it is understood that it is capable of further modification, uses and/or adaptations following in general the principles of the invention and including such departures from the present disclosure as come within known or customary practice in the art to which the invention pertains, and as may be applied to the essential features set forth and fall within the scope of the invention or the limits of the appended claims.

What is claimed is:

1. A collet assembly, comprising:
   an arbor including a flange portion having a tapered annular recess constructed and arranged to cooperate with an annular tapered projection of a machine tool spindle for centering said arbor with respect to said machine tool spindle when said arbor is coupled thereto, said arbor including a shaft portion extending from said flange portion;
   said shaft portion including a first conical surface disposed at its free end and a second conical surface disposed adjacent said flange portion;
   said first and second conical surfaces being parallel to each other and disposed radially inwardly in the direction away from said flange portion;
   an expanding collet having alternately disposed slots to form a plurality of fingers extending inwardly from opposite collet ends and having inner conical surfaces at said collet ends that cooperate with said first and second conical surfaces;
   said expanding collet being axially slidably disposed around said shaft portion between a relaxed position when said collet is disposed away from said flange portion and an expanded position when disposed toward said flange portion;
   a draw plug disposed axially through said arbor in an opening in said shaft portion, said plug having a flanged head in engagement with one end of said collet;
   a draw bar adapter disposed within a recess in said arbor and securing one end of said draw plug, said adapter being secured to a draw bar for axially actuating said draw plug, thereby actuating said collet;
   an annular work locating stop secured to said flange portion and overlying at least a portion of an annular periphery of said collet, said stop having an annular free edge for abutting against a workpiece; and
   a key screw disposed on said arbor and engaging said adapter to prevent relative motion of said adapter with said arbor.

2. A collet assembly as in claim 1, further comprising:
   a pin disposed in said shaft portion, said pin having a portion protruding above the surface of said shaft portion; and
   said collet includes a recess adapted to slidably receive said pin, said recess has a base that engages said pin when said collet is in said expanded position.

3. A collet assembly as in claim 1, further comprising a seal disposed in said shaft opening between said shaft portion and said plug.

4. A collet assembly as in claim 3, wherein said seal is carried by said plug.

5. A collet assembly as in claim 1, wherein:
   said expanding collet slots each includes a base connecting adjacent said fingers; and
   said base is disposed below the outer cylindrical surface of said collet.

6. A collet assembly as in claim 5, wherein said base includes said collet conical surfaces.

7. A collet assembly as in claim 1, wherein said work locating stop is removably secured to said arbor.

8. A collet assembly as in claim 1, wherein said work locating stop is machinable.

9. A collet assembly as in claim 1, wherein said adapter is machinable to adapt to the draw bar.

10. A collet assembly, comprising:
    an arbor, including a shaft portion at a first end and a threaded bushing at a second end for securing to a machine tool spindle and draw bar, said second end including a tapered annular recess constructed and arranged to cooperate with an annular tapered projection of the machine tool spindle for centering said arbor with respect to the machine tool spindle when said arbor is coupled thereto;

a work locating stop adaptor mounted on the arbor adjacent to said shaft portion;

said shaft portion including a first conical surface disposed at its free end and a second conical surface disposed adjacent said work locating stop adaptor;

said first and second conical surfaces being parallel to each other and disposed radially inwardly in the direction away from said work locating stop adaptor;

an expanding collet having alternately disposed slots to form a plurality of fingers extending inwardly from opposite collet ends and having inner conical surfaces at said collet ends that cooperate with said first and second conical surfaces;

said expanding collet being axially slidably disposed around said shaft portion between a relaxed position when said collet is disposed away from said work locating stop adaptor and an expanded position when disposed toward said work locating stop adaptor;

a draw plug disposed axially through said arbor in an opening in said shaft portion and being secured to a threaded end section of said opening, the threaded end section of said opening being connected to said threaded bushing of said arbor, said plug including a flanged head in engagement with one end of said collet; and an annular work locating stop secured to said work locating stop adaptor and overlying at least a portion of an annular periphery of said collet, said stop having an annular free edge for abutting free edge for abutting against a workpiece.

11. A collet assembly as in claim 10, further comprising:
a pin disposed in said shaft portion, said pin having a portion protruding above the surface of said shaft portion; and
said collet includes a recess adapted to slidably receive said pin, said recess has a base that engages said pin when said collet is in said expanded position.

12. A collet assembly as in claim 10, further comprising a seal disposed in said shaft opening between said shaft portion and said plug.

13. A collet assembly as in claim 12, wherein said seal is carried by said plug.

14. A collet assembly as in claim 10, wherein:
said expanding collet slots each include a base connecting adjacent said fingers; and
said base is disposed below the outer cylindrical surface of said collet.

15. A collet assembly as in claim 14, wherein said base includes said collet conical surfaces.

16. A collet assembly as in claim 10, wherein said work locating stop is machinable.

17. A collet assembly, comprising:
an arbor including a flange portion having a tapered annular recess constructed and arranged to cooperate with an annular tapered projection of a machine tool spindle for centering said arbor with respect to the machine tool spindle when said arbor is coupled thereto, said arbor including a shaft portion extending from said flange portion;

said shaft portion including a first conical surface disposed at its free end;

said conical surface being disposed radially inwardly in the direction away from said flange portion;

an expanding sleeve having a plurality of slots to form a plurality of fingers extending outwardly away from said flange portion toward its free end from intermediate said sleeve and having inner conical surfaces at said free end that cooperate with said sleeve conical surfaces;

said expanding sleeve being axially slidably disposed around said shaft portion between a relaxed position when said sleeve is disposed away from said flange portion and an expanded position when disposed toward said flange portion;

a draw plug disposed axially through said arbor in an opening in said shaft portion, said plug having a flanged head in engagement with one end of said sleeve;

a draw bar adapter coupled to an end of said draw plug, said adapter being secured to a draw bar for axially actuating said draw plug, thereby actuating said collet;

an expanding collet having a portion overlying said expanding sleeve and a nose portion extending axially from said overlying portion, said expanding collet having a plurality of slots disposed toward its free end away from said flange portion, said expanding collet being adapted to expand when said expanding sleeve is expanded;

said nose portion being adapted to be inserted internally into a workpiece;

an annular stop disposed around said expanding collet overlying portion, said stop having an annular free edge for abutting against a workpiece; and a set screw disposed in said arbor engaging said adapter to prevent relative motion of said adapter with said arbor.

18. A collet assembly as in claim 17, further comprising:
a pin disposed in said shaft portion, said pin having a portion protruding above the surface of said shaft portion; and
said expanding sleeve includes a recess adapted to slidably receive said pin, said recess has a base that engages said pin when said sleeve is in said expanded position.

19. A collet assembly as in claim 17, further comprising a seal disposed in said shaft opening between said plug and said shaft portion.

20. A collet assembly as in claim 19, wherein said seal is carried by said plug.

21. A collet assembly as in claim 17, wherein said expanding collet is removably secured to said flange portion.

22. A collet assembly as in claim 17, wherein said stop is machinable.

23. A collet assembly as in claim 17, wherein said adapter is machinable.

24. A collet assembly, comprising:
an arbor including a flange portion for securing to a machine tool spindle and a shaft portion extending from said flange portion, said shaft portion including a first conical surface disposed at its free end, said conical surface being disposed radially inwardly in the direction away from said flange portion;

an expanding sleeve having a plurality of slots to form a plurality of fingers extending outwardly away from said flange portion toward its free end from intermediate said sleeve and having inner conical surfaces at said free end that cooperate with said sleeve conical surfaces, said expanding sleeve being axially slidably disposed around said shaft portion between a relaxed position when said sleeve is disposed away from said flange portion and an expanded position when disposed toward said flange portion;

a draw plug disposed axially through said arbor in an opening in said shaft portion, said plug having a flanged head in engagement with one end of said sleeve;

a draw bar adapter disposed within a end of said draw plug, said adapter being secured to a draw bar for axially actuating said draw plug, thereby actuating said collet;

an expanding collet having a portion overlying said expanding sleeve and a nose portion extending axially from said overlying portion, said expanding collet having a plurality of slots disposed toward its free end away from said flange portion, said expanding collet being adapted to expand when said expanding sleeve is expanded; said nose portion being adapted to be inserted internally into a workpiece; and an annular stop disposed around said expanding collet overlying portion, said stop having an annular free edge for abutting against a workpiece, said nose portion being substantially solid, said collet overlying portion slots having a first width and said nose portion slots disposed at the periphery having a second width and within the interior a third width.

25. A collet assembly, comprising:

an arbor including a flange portion having a..tapered annular recess constructed and arranged to cooperate with an annular tapered projection of a machine tool spindle for centering said arbor with respect to said machine tool spindle when said arbor is coupled thereto, said arbor including a shaft portion extending from said flange portion;

said shaft portion including a first conical surface disposed at its free end and a second conical surface disposed adjacent said flange portion;

said first and second conical surfaces being parallel to each other and disposed radially inwardly in the direction away from said flange portion;

an expanding collet having alternately disposed slots to form a plurality of fingers extending inwardly from opposite collet ends and having inner conical surfaces at said collet ends that cooperate with said first and second conical surfaces;

said expanding collet being axially slidably disposed around said shaft portion between a relaxed position when said collet is disposed away from said flange portion and an expanded position when disposed toward said flange portion;

a draw plug disposed axially through said arbor in an opening in said shaft portion, said plug having a flanged head in engagement with one end of said collet;

a draw bar adapter disposed within a recess in said arbor and securing one end of said draw plug said adapter being secured to a draw bar for axially actuating said draw plug, thereby actuating said collet;

an annular work locating stop secured to said flange portion and overlying at least a portion of an annular periphery of said collet, said stop having an annular free edge for abutting against a workpiece; and a set screw for locking said adapter with respect to said arbor, said draw plug and said adapter including interengaging threads for securing said draw plug to said adapter, and said adapter including a threaded bore for threaded engagement with the draw bar, said draw plug including a boss for engaging a surface of said adapter upon threaded interengagement of said draw plug and said adapter so that said draw plug is locked with respect to said arbor.

26. A collet assembly, comprising:

an arbor including a flange portion having a tapered annular recess constructed and arranged to cooperate with an annular tapered projection of a machine tool spindle for centering said arbor with respect to the machine tool spindle when said arbor is coupled thereto, said arbor including a shaft portion extending from said flange portion;

said shaft portion including a first conical surface disposed at its free end;

said conical surface being disposed radially inwardly in the direction away from said flange portion;

an expanding sleeve having a plurality of slots to form a plurality of fingers extending outwardly away from said flange portion toward its free end from intermediate said sleeve and having inner conical surfaces at said free end that cooperate with said sleeve conical surfaces;

said expanding sleeve being axially slidably disposed around said shaft portion between a relaxed position when said sleeve is disposed away from said flange portion and an expanded position when disposed toward said flange portion;

a draw plug disposed axially through said arbor in an opening in said shaft portion, said plug having a flanged head in engagement with one end of said sleeve;

a draw bar adapter coupled to an end of said draw plug, said adapter being secured to a draw bar for axially actuating said draw plug, thereby actuating said collet;

an expanding collet having a portion overlying said expanding sleeve and a nose portion extending axially from said overlying portion, said expanding collet having a plurality of slots disposed toward its free end away from said flange portion, said expanding collet being adapted to expand when said expanding sleeve is expanded;

said nose portion being adapted to be inserted internally into a workpiece;

an annular stop disposed around said expanding collet overlying portion, said stop having an annular free edge for abutting against a workpiece; and a set screw for locking said adapter with respect to said arbor, said draw plug and said adapter including interengaging threads for securing said draw plug to said adapter, and said adapter including a threaded bore for threaded engagement with the draw bar, said draw plug including a boss for engaging a surface of said adapter upon threaded interengagement of said draw plug and said adapter so that said draw plug is locked with respect to said arbor.

* * * * *